US006978288B1

(12) United States Patent
Natarajan

(10) Patent No.: US 6,978,288 B1
(45) Date of Patent: Dec. 20, 2005

(54) COEFFICIENT UPDATE UNIT

(75) Inventor: Sivaraman Natarajan, Burlington, VT (US)

(73) Assignee: Young Chang Akki Co., LTD, Inchon (KR)

( * ) Notice: Subject to any disclaimer, the term of this patent is extended or adjusted under 35 U.S.C. 154(b) by 645 days.

(21) Appl. No.: 10/215,117

(22) Filed: Aug. 8, 2002

(51) Int. Cl.[7] .................................................. G06F 7/38
(52) U.S. Cl. ....................................... 708/290; 708/274
(58) Field of Search ................................ 708/270, 271, 708/274, 290

(56) References Cited

U.S. PATENT DOCUMENTS

| | | | | |
|---|---|---|---|---|
| 4,313,173 A * | 1/1982 | Candy et al. | ............... | 708/290 |
| 4,757,465 A * | 7/1988 | Hakoopian et al. | ......... | 708/290 |
| 5,694,345 A * | 12/1997 | Peterson | ..................... | 708/290 |
| 5,898,878 A * | 4/1999 | Densham et al. | ........... | 710/260 |
| 5,937,010 A * | 8/1999 | Petranovich et al. | ........ | 375/295 |
| 6,141,671 A * | 10/2000 | Adams et al. | ............. | 708/313 |

* cited by examiner

*Primary Examiner*—Chuong D Ngo
(74) *Attorney, Agent, or Firm*—Cesari and McKenna, LLP

(57) ABSTRACT

A system for updating a control coefficient to a target value during a prescribed number of periodic incremental update increments. The system divides the desired change in the value of the coefficient by the number of update increments. Specifically, the number of increments by the number of increments is limited to powers of two, so that the division can be accomplished simply by demarking the change in value according to the portion of number of increments, thereby separating the change into a quotient and a remainder. The value of each update increment is nominally equal to the quotient, with the remainder being distributed relatively evenly by adding one to selected updates.

8 Claims, 4 Drawing Sheets

| Period | Current Coeff | CNT (bin) | Bit-Reversed REM | REM Adjust? | Incremental Update | Updated Coeff |
|---|---|---|---|---|---|---|
| 1 | 100 | 1001 | 110 | N | 9 | 91 |
| 2 | 91 | 1010 | 110 | Y | 10 | 81 |
| 3 | 81 | 1011 | 110 | N | 9 | 72 |
| 4 | 72 | 1100 | 110 | Y | 10 | 62 |
| 5 | 62 | 1101 | 110 | N | 9 | 53 |
| 6 | 53 | 1110 | 110 | Y | 10 | 43 |
| 7 | 43 | 1111 | 110 | N | 9 | 34 |
| 8 | 34 | 0000 | 110 | N | 9 | 25 |

FIG. 3

| Period | Current Coeff | CNT (bin) | Bit-Reversed REM | REM Adjust? | Incremental Update | Updated Coeff |
|---|---|---|---|---|---|---|
| 1 | 25 | 1001 | 101 | Y | -9 | 34 |
| 2 | 34 | 1010 | 101 | N | -10 | 44 |
| 3 | 44 | 1011 | 101 | Y | -9 | 53 |
| 4 | 53 | 1100 | 101 | N | -9 | 62 |
| 5 | 62 | 1101 | 101 | Y | -9 | 71 |
| 6 | 71 | 1110 | 101 | N | -10 | 81 |
| 7 | 81 | 1111 | 101 | Y | -9 | 90 |
| 8 | 90 | 0000 | 101 | N | -10 | 100 |

FIG. 4

| Period | Current Coeff | CNT (bin) | Bit-Reversed REM (bin) | REM Adjust? | Incremental Update | Updated Coeff |
|---|---|---|---|---|---|---|
| 1 | 95 | 10001 | 1101 | Y | 0 | 95 |
| 2 | 95 | 10010 | 1101 | N | -1 | 96 |
| 3 | 96 | 10011 | 1101 | Y | 0 | 96 |
| 4 | 96 | 10100 | 1101 | Y | 0 | 96 |
| 5 | 96 | 10101 | 1101 | Y | 0 | 96 |
| 6 | 96 | 10110 | 1101 | N | -1 | 97 |
| 7 | 97 | 10111 | 1101 | Y | 0 | 97 |
| 8 | 97 | 11000 | 1101 | Y | 0 | 97 |
| 9 | 97 | 11001 | 1101 | Y | 0 | 97 |
| 10 | 97 | 11010 | 1101 | N | -1 | 98 |
| 11 | 98 | 11011 | 1101 | Y | 0 | 98 |
| 12 | 98 | 11100 | 1101 | Y | 0 | 98 |
| 13 | 98 | 11101 | 1101 | Y | 0 | 98 |
| 14 | 98 | 11110 | 1101 | N | -1 | 99 |
| 15 | 99 | 11111 | 1101 | Y | 0 | 99 |
| 16 | 99 | 00000 | 1101 | N | -1 | 100 |

FIG. 5

COEFFICIENT UPDATE UNIT

BACKGROUND OF THE INVENTION

1. Field of the Invention

This invention relates to a coefficient update unit used to effect a linear change in an electrical characteristic over a controllable time interval. More specifically it relates to an update unit used in music synthesizers and the like to effect changes in such characteristics as the amplitude of an audio signal.

2. Background Information

In music synthesizers it is often desirable to provide pre-programmed, electrically controllable changes in the characteristics of an audio signal. Thus synthesizers can automatically effect a prescribed change in the amplitude of a signal over a prescribed time interval. For reasons related to cost and speed of operation this is usually accomplished with a finite state machine that is constructed as an Application Specific Integrated Circuit (ASIC). The circuitry first divides the desired amplitude change by a number of standard time intervals to determine the nominal per-period update increment (PPI) in the coefficient. With the passage of each time interval the amplitude is incrementally updated by the amount of the PPI. The process is terminated when the target amplitude is reached.

If the prescribed change in signal characteristic is not exactly divisible by the prescribed number of time intervals, i.e. incremental coefficient updates, the resulting remainder must be distributed among the incremental updates. In practice this has been accomplished by adding one bit to selected incremental updates and subtracting one from the remainder until the remainder reaches zero. In prior systems, the remainder has not been spread evenly across the entire update period. This may result in a perceived noise update during the update procedure.

Specifically, if division of the amplitude change by the prescribed number of time intervals results in a quotient whose magnitude is greater than zero, the prior system ignores the remainder. This leaves a residue unless the remainder is zero and one or more further update routines must then be undertaken to effect the entire amount of the originally commanded update. Obviously, this results in an uneven distribution of the update increments. Moreover, this arrangement requires repeated involvement of the processor that commands the updates.

On the other hand, when the quotient is zero, the prior system increments (or decrements) the coefficient by one unit in successive time intervals until the remainder has been "used up". The coefficient will thus reach its final value before the end of the commanded transition period and then remain unchanged for the remainder of the period.

Another drawback of the foregoing arrangement is the relatively large amount of the storage required. Moreover, the algorithm for division of the coefficient change by the number of requested time intervals requires a relatively long cycle for the state machine which processes the coefficient updates.

SUMMARY OF THE INVENTION

A coefficient update unit incorporating the invention limits the number of incremental updates to powers of two. In binary terms, the division of the coefficient difference amounts to shifting the coefficient difference to the right. The quotient then comprises the bits to the left of the binary point and the remainder comprises the bits to the right. To keep track of the binary point the unit uses the most significant bit of the commanded number of time intervals. For example, if the initial value is 8, i.e., binary 1000, the one in the most significant bit position of the count marks the position of the binary point separating the quotient from the remainder. In the preferred arrangement, the system then counts upward from this number, i.e., from 8 in this example. In the seventh interval the interval count will reach 15 (binary 1111). In the end of the eighth interval the last four bits of the count will reach binary 0000, indicating that the update has been completed.

The update unit also includes a novel arrangement for distributing the remainder uniformly among the update intervals. During each counting cycle it ascertains the bit position in the interval count in which the bit changes from a zero to a one. It then checks the corresponding bit in the reversed remainder. If that bit is a one, it adds a bit to the quotient in increasing (or decreasing) the coefficient that is to be updated. With the foregoing arrangement, the update unit completes an update with exactly the prescribed number of update intervals. The cleared state of the interval count can thus be used as an indicator of update completion.

BRIEF DESCRIPTION OF THE DRAWINGS

The invention description below refers to the accompanying drawings, of which:

FIG. 3 is a chart of incremental coefficient updates in an example in which a coefficient is decreased;

FIG. 4 is a chart of incremental coefficient updates in an example in which a coefficient is increased; and FIG. 5 is a chart of incremental coefficient updates involved in a small change in a coefficient.

DETAILED DESCRIPTION OF AN ILLUSTRATIVE EMBODIMENT

Figure 1:
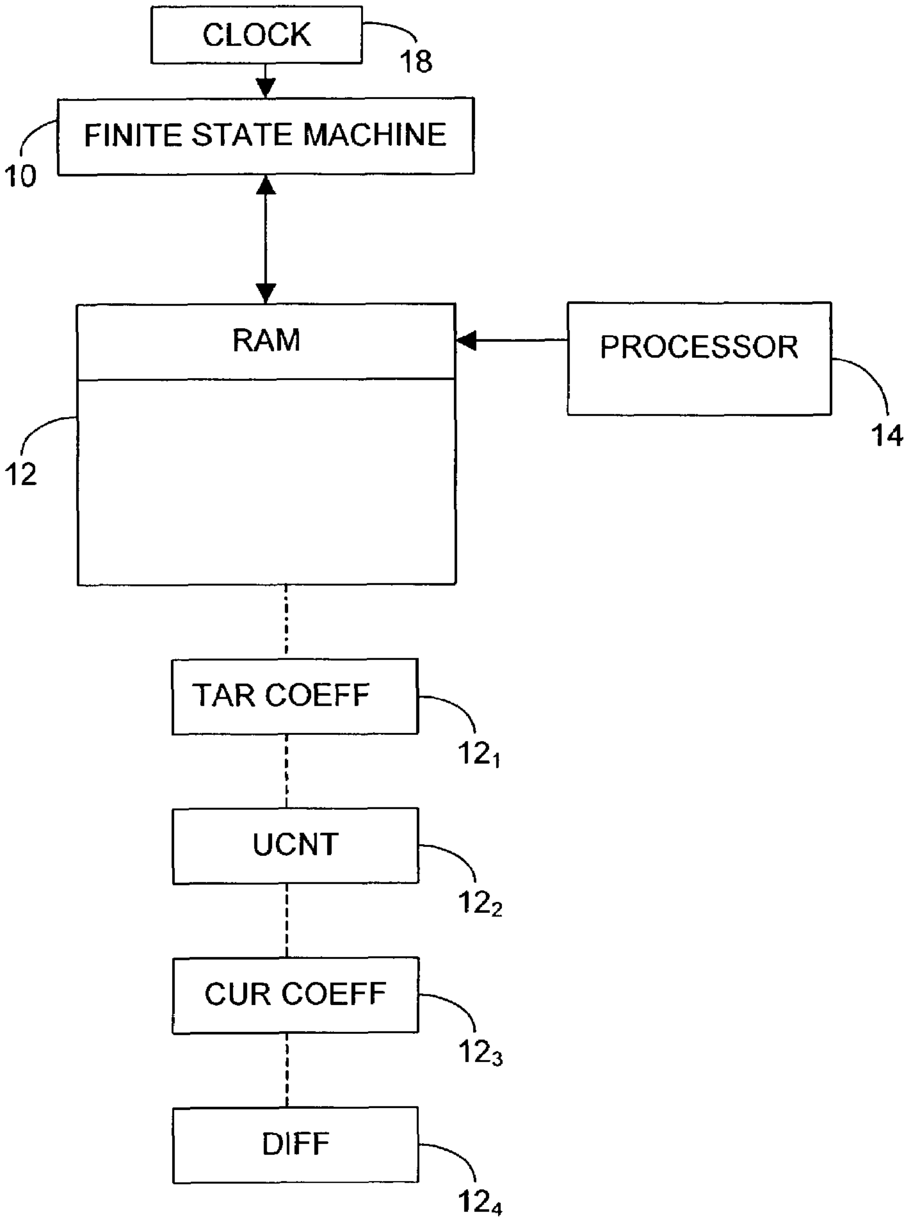
FIG. 1 is a diagram of a coefficient update unit incorporating the invention.

As depicted in FIG. 1, an update unit incorporating the invention comprises a finite state machine 10 and a random access memory (RAM) 12 containing data that is retrieved by, and modified by, the state machine 10. Illustratively the update unit is a component of a music synthesizer that also includes a microprocessor 14. The processor 14 has read and write access to the RAM 12 and it also performs various functions that are not relevant to the operation of the update unit. The update unit further includes connections to buses 16 to deliver its outputs to other units (not shown) in the synthesizer.

A system clock 18 times the operation of the state machine 10. Preferably, the clock has a frequency related to the rate at which the synthesizer delivers output samples to an audio output unit (not shown).

When a coefficient is to be updated, the processor 14 loads the value of the target coefficient into a memory location $\mathbf{12}_1$ and loads a location $\mathbf{12}_2$ with an initial update interval count (UCNT), i.e., the number of standard update intervals over which the update is to be effected. The state machine 10 then subtracts the target coefficient from the current coefficient, which is contained in a memory location $\mathbf{12}_3$, to obtain a difference (DIFF) that is stored in a location $\mathbf{12}_4$. The difference is divided by the initial interval count to determine the nominal per-period update increment (PPI) in each clock period.

Specifically, the initial interval count is constrained to be a power of 2. In binary terms it is, therefore, a number containing a single one followed by zeros. The division thus amounts to moving the binary point of DIFF to the left by a number of places equal to the number of zeros following the one in the commanded count. The position of that one thus marks the binary point in DIFF that separates the quotient from the remainder.

The update operation then consists of increasing (or decreasing) the current coefficient by the nominal per-period increment (PPI), i.e. the quotient, with the increment being increased by 1 during selected update intervals to distribute the remainder substantially uniformly throughout these intervals.

More specifically, each time the current coefficient is incremented, the update interval count is increased by one. The single bit in the count that changes from a zero to a one is detected and, if the bit in the corresponding position of the reversed remainder is a one, the increment to the current coefficient is changed by (PPI+1). Otherwise, the current coefficient is changed by an increment equal to PPI. As the interval count increases, it eventually reaches 2*(initial UCNT)−1, whose binary representation is all ones. In the next clock interval the incrementing of the interval count causes it to return to zero. The update has thus been completed; this state of the interval count is sensed by the state machine 10 to terminate the update operation.

In the preferred arrangement all incremental updates are effected by subtraction. Thus, when the coefficient is to be decreased, DIFF has a positive value and when the PPI (the quotient portion of DIFF) is subtracted from the current coefficient, the coefficient is decreased. Conversely, when the coefficient is to be increased, DIFF has a negative value and thus, when PPI is subtracted from the current coefficient, the coefficient is increased. This arrangement simplifies the circuitry of the state machine 10. Specifically, the circuitry need not be able to perform both additions and subtractions. This is a desirable feature when the state machine is constructed as an Application Specific Integrated Circuit (ASIC), since it helps to minimize the physical area of the circuit.

The state machine can, of course, be constructed differently without departing from the invention. Thus it may be capable of both additions and subtractions or, if the target coefficient is sent to the update unit as a negative number, it may be constructed with circuits that can add, but not subtract, when performing the incremental updates.

Figure 2:
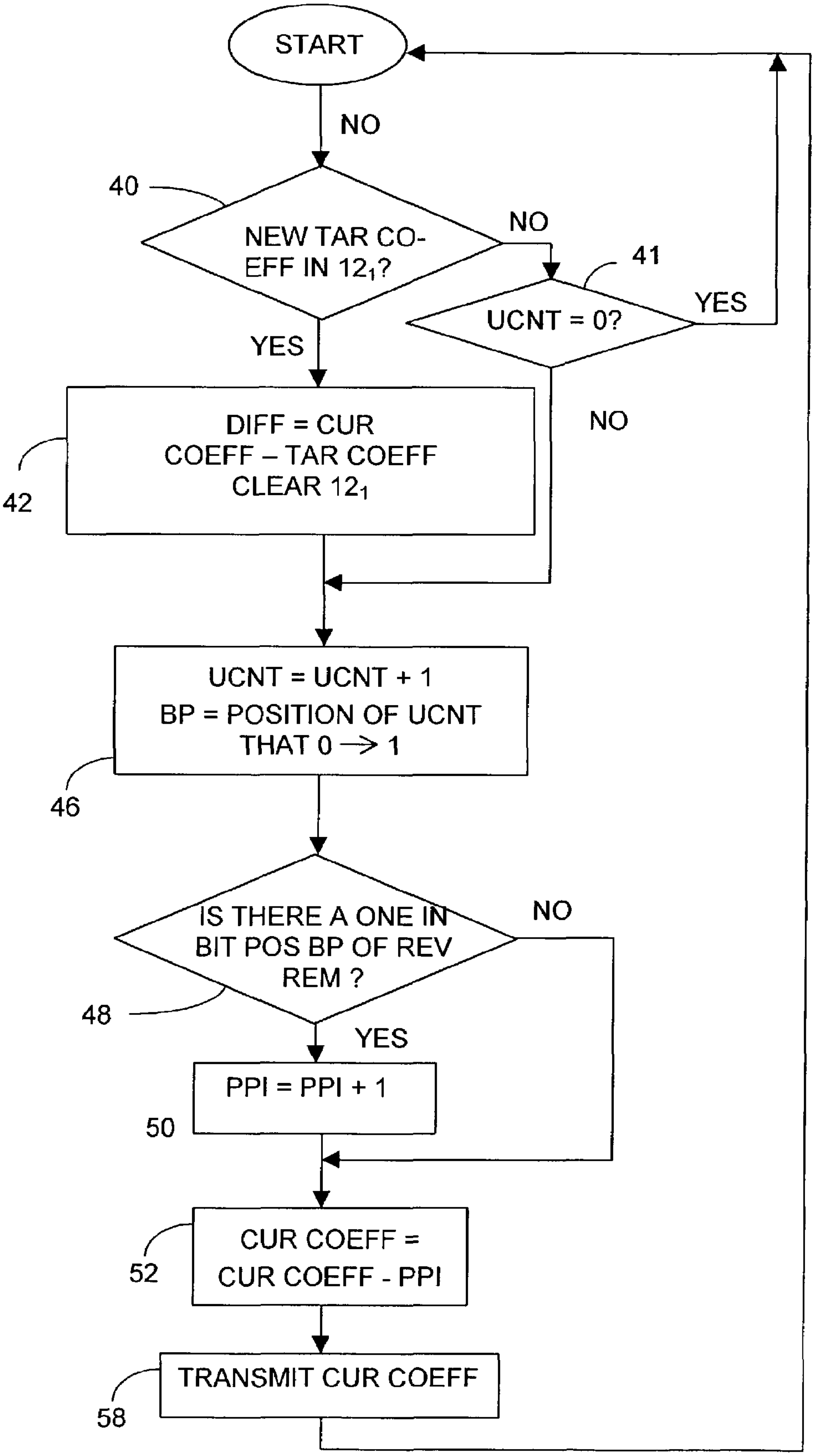
FIG. 2 is a flow chart of the operation of the state machine in FIG. 1 in updating a coefficient.

An example of the logic design and operation of the state machine 10 is illustrated in FIG. 2. At the beginning of each update cycle, the state machine examines the content of the target coefficient register $\mathbf{12}_1$ at step 40. If it contains a target coefficient to be processed by the state machine, the process continues to step 42. In that step the difference between the current coefficient and the target coefficient is calculated and entered into the memory location $\mathbf{12}_4$. Also the location $\mathbf{12}_1$ is cleared.

Next, in step 46, UCNT is incremented and the bit position, BP, of UCNT which changes from a zero to a one is ascertained.

In step 48, the state machine 10 ascertains whether the reversed remainder contains a 1 in the bit position corresponding to the bit position ascertained in step 46. If it is a 1, PPI is increased by 1 at step 50. Otherwise, the process proceeds directly to step 52, where the PPI is subtracted from the current coefficient, thus incrementally updating the coefficient. Next, at step 58 the current coefficient is transmitted to the unit that is controlled in accordance with the coefficient. The state machine then returns to step 40.

On the next pass through the loop, with the register $\mathbf{12}_1$ not containing a target value to be processed by the state machine, the process branches to step 41, in which the update interval count (UCNT) is checked. Assuming that it is not zero, the machine proceeds to step 46 and the coefficient is updated, as described above, in steps 48–52.

With the prescribed number of incremental updates, UCNT will ultimately advance to zero and, at step 40, the update procedure will terminate. In practice, the zero state of UCNT may be sensed by detecting an overflow from the most significant one in the register $\mathbf{12}_2$ when UCNT is incremented.

The system can be configured to decrease UCNT during each update interval and detect the clearing of UCNT to terminate the update procedure. In that case the remainder can be distributed among the incremental updates by detecting the bit in UCNT that changes from one to zero and adding one to PPI if the corresponding bit of the reversed remainder is a one. However, I prefer to count upward, as illustrated herein, because this preserves the most significant one in UCNT, which is used to separate the quotient (PPI) from the remainder in DIFF. If a downward count is used, an additional memory location is required to provide the demarcation between these two quantities.

At any time, the CPU 14 (FIG. 1) may load a new target coefficient into the register $\mathbf{12}_1$, and a new initial interval count into the register $\mathbf{12}_2$. The state machine will then execute step 42, regardless of whether a previous update procedure has been completed.

The drawing illustrates the procedure for update of a single coefficient. However, in practice the state machine 10 updates a plurality of coefficients. The RAM 12 (FIG. 1) contains a set of registers for each coefficient and, in round-robin fashion, the state machine 10 traverses the loop of FIG. 2 once, in turn, for each coefficient.

An example of the foregoing operation is illustrated in FIG. 3. Assume that the current value of a coefficient is 100 and it is to be decreased to 25 in a transition time of 8 update intervals (binary 1000). Subtraction of the target coefficient from the present coefficient results in a difference (DIFF) value of 75 (binary 1001011). Division of DIFF by the number of clock periods effectively shifts DIFF to the right by three bit positions. This yields a per period increment (PPI) of 9 (binary 1001) and a remainder of 3 (binary 011). The reversed remainder is thus 110.

Continuing in FIG. 3, during the first period the interval count increases from 1000 to 1001. Thus the change from 0 to 1 thus occurs in the last bit of the count. The corresponding bit of the reversed remainder is 0. Therefore, the PPI is not adjusted and the incremental update is 9. In the second period the count increases to 1010. Thus the second bit from the right changes from a 0 to a 1. The corresponding bit of the reversed remainder is a one and therefore the magnitude PPI is increased by one to provide an incremental update of 10 for the coefficient. The process continues as illustrated until the count cycles to zero. Examination of the Incremental Update column shows that the remainder (3) is distributed fairly evenly among the incremental updates.

In FIG. 4 I have illustrated the sequence of incremental coefficient updates performed by the preferred embodiment of the update unit if a coefficient is to be increased from 25 to 100 over eight update intervals. Subtraction of the target coefficient from the current coefficient results in −75 (binary 1111111110110101). In this case the “quotient” is −10 (binary 0110) and the “remainder” is −3 (binary 101). Using these two values, the update follows the steps illustrated in FIG. 4, again distributing the remainder among the update intervals.

Finally, FIG. 5 illustrates the update sequence when a small change in coefficients is to be effected over a relatively large number of update intervals. In this example coefficient is changed from 95 to 100 over 16 periods. DIFF thus has a value of −5 (binary 11111111111111011). Division by 16 shifts DIFF to the right four places, resulting in a "quotient" of −1 and a "remainder" of 11 (binary 1011). The resulting incremental updates are shown in Fig. While the remainder is distributed somewhat unevenly among the update intervals, this result is significantly better than loading the entire update into the first or last interval.

What is claimed is:

1. A coefficient update system for updating a control coefficient over a prescribed number of periodic update intervals, the system comprising:

A. a memory containing a plurality of locations, a first of said locations containing a current value of said coefficient, B. means for receiving a target value of said coefficient and an initial interval count designating the number of update intervals over which the current value of said coefficient is to be changed to the target value, said initial interval count being a power of 2, C. a finite state machine comprising:

1. means for storing the difference between said target coefficient value and said current value,
2. means for ascertaining the quotient and the remainder of a division of said difference by said initial interval count by demarking said difference according to the value of said initial count,
3. incremental update means for, during each update interval,
   (a) incrementing said interval count, and
   (b) increasing or decreasing said current coefficient, depending on whether said difference is positive or negative, nominally by an update increment equal to the value of said quotient, and
4. terminating the operation of said incremental update means at the end of an update interval in which the interval count has reached zero.

2. The system defined in claim 1 in which said state machine includes means for:

A. incrementing said interval count by increasing it by one;

B. ascertaining which bit of said interval count changes from zero to one when the interval count is incremented; and C. increasing said update by one if there is a 1 in the bit position of the reversed remainder corresponding to the bit in the interval count that changes from zero to one.

3. The update system of claim 2 in which said state machine terminates updating when there is an overflow from the most significant one of said interval count.

4. The system of claim 2 which uses the position of the most significant one in said interval count to demark said difference.

5. A method of updating a control coefficient over a prescribed number of periodic update intervals, the method comprising:

A. storing a current value of the coefficient;

B. receiving a target value of the coefficient and an initial interval count representing the number of periodic intervals in which the coefficient is to be changed from the current value to the target value thereof, said number of intervals being a power of two;

C. storing the difference between the target value and the current value;

D. demarking said difference according to said number of intervals, thereby determining the quotient and remainder resulting from division of said difference by said initial count;

E. incrementally updating said current coefficient value during each interval by 1) incrementing the interval count by one, 2) increasing or decreasing said current coefficient by an update increment nominally equal to the value of said quotient, depending on whether said difference is positive or negative and 3) terminating said incremental updating at the end of an update interval in which interval count has reached zero.

6. The method of claim 5 including the steps of:

A. incrementing said interval count by increasing it by one;

B. ascertaining which bit of said interval count changes from a zero to one when the interval count is incremented; and C. adding to said update if there is a one in the bit position of the reversed remainder corresponding to the bit in the interval count that changes from zero to one.

7. The method of claim 6 in which the position of the most significant one of the interval count is used to demark said difference.

8. The method of claim 6 in which updating is terminated when there is an overflow from the most significant one of said interval count.

* * * * *